United States Patent [19]

Benton

[11] Patent Number: 4,560,229
[45] Date of Patent: Dec. 24, 1985

[54] BATTERY POST EXTENSION MEMBER

[76] Inventor: Michael W. Benton, 2738 Roosevelt Blvd., #1101, Clearwater, Fla. 33520

[21] Appl. No.: 653,154

[22] Filed: Sep. 24, 1984

[51] Int. Cl.⁴ ............................................. H01R 11/26
[52] U.S. Cl. ..................................................... 339/224
[58] Field of Search ...................... 339/95 B, 224–240, 339/277 R

[56] References Cited

U.S. PATENT DOCUMENTS 3,605,065  9/1971  Shannon ............................... 339/224
3,783,439  1/1974  Valentino ............................. 339/237
3,928,079  12/1975 Jennings et al. ..................... 339/224

Primary Examiner—Gil Weidenfeld
Assistant Examiner—Paula A. Austin
Attorney, Agent, or Firm—Ronald E. Smith

[57] ABSTRACT

A safety device that is attachable to battery posts to extend the effective length of such posts. The device has a looped proximal end that is slideably mounted on a battery post in underlying relation to a cable clamp, and a flat distal end integrally formed with the proximal end. The distal and proximal ends of the device are electrically conductive, but a non-conductive cover is provided to encase the distal end of the device when it is not in use. A juncture line is formed where the proximal and distal ends meet, and the juncture line is yieldable so that the angular disposition between the distal and proximal ends of the device can be adjusted from a coplanar, 180 degree angular relationship to a substantially perpendicular relationship, the coplanar adjustment having utility in the context of side mounted battery posts and the latter adjustment having utility in the context of top mounted battery posts.

8 Claims, 7 Drawing Figures

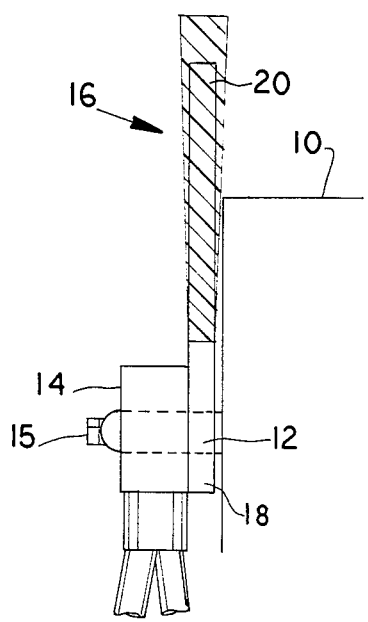
FIG_1
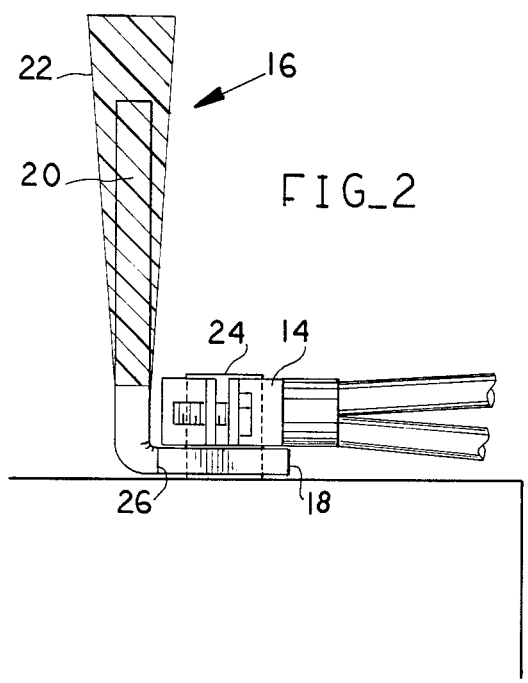
FIG_2
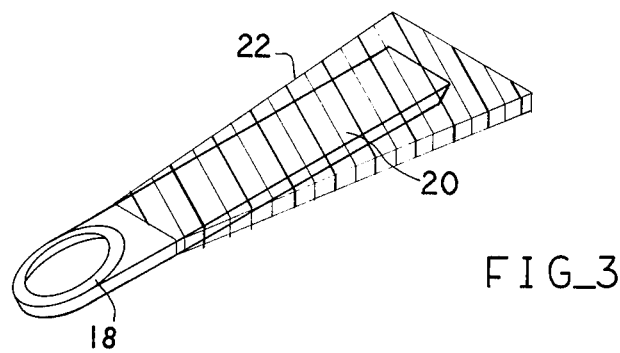
FIG_3

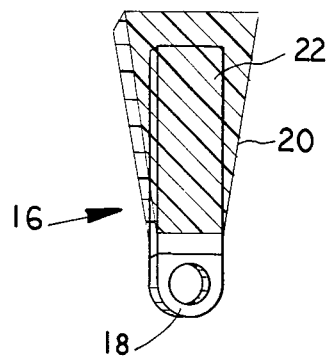
FIG_4
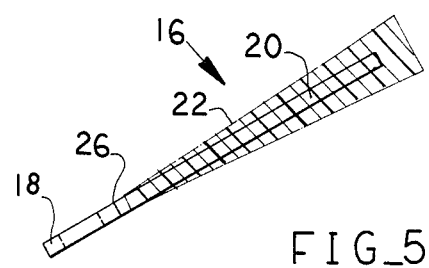
FIG_5
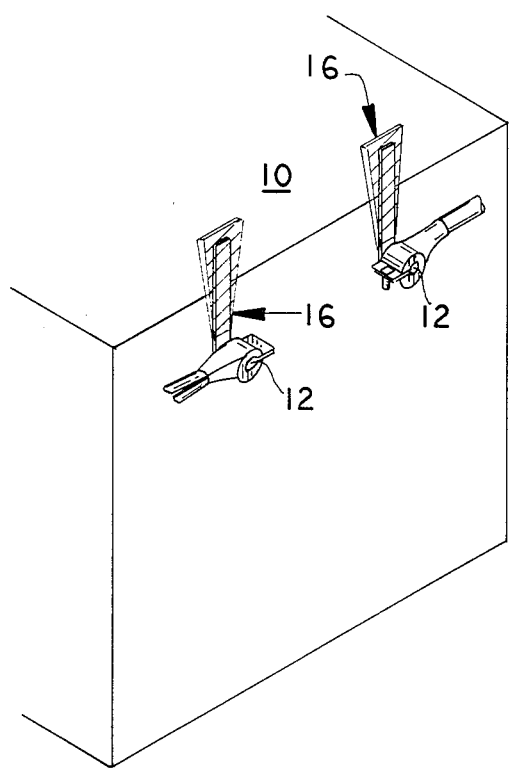
FIG_6
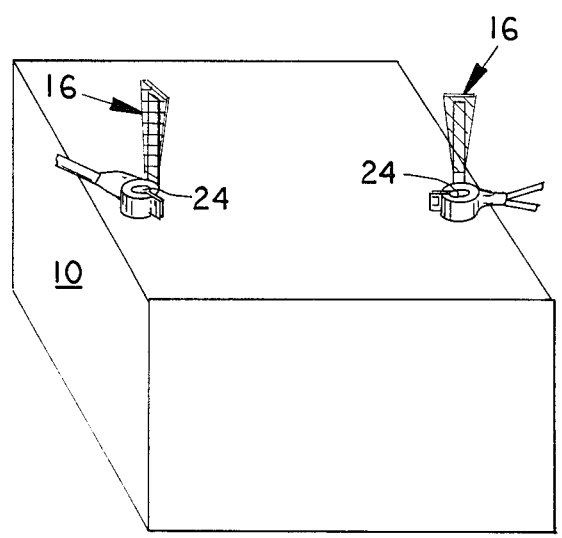
FIG_7

BATTERY POST EXTENSION MEMBER

BACKGROUND OF THE INVENTION

1. Field of the Invention

This invention relates generally to devices used in the temporary connecting of good or energy-producing wet cell batteries to bad or non energy-producing wet cell batteries to revive or regenerate the latter, and more particularly relates to a device that extends the height of the battery posts to facilitate a good electrical connection between the posts and clamping members associated with booster cables.

2. Description of the Prior Art

A search of United States patents that was conducted prior to the filing of this disclosure located the following disclosures in the field of this invention: U.S. Pat. Nos. 2,551,990 which shows a means allowing a quick connect-disconnect cable attachment to a common storage battery; 3,605,065 which features a cable connection adapter from which multiple connections are possible; 3,745,516 which shows a device intended for use as an auxiliary cable connection point to provide an extension of the normal battery post; 3,783,439 showing a battery post connector that can be attached to the vehicle battery without disturbing the normal cable connections; 4,082,401 which shows a device that represents the closest prior art to the subject invention, the device fits under the normal vehicle cable connection to the battery but is structurally very different from the device disclosed herein; 4,377,317 which includes a relatively thin auxillary connector capable of attaching under a normal vehicle cable clamp; and 4,420,213 which shows multiple cable connections to the battery post.

Vehicles equipped with wet cell batteries may not be started when such batteries become incapable of generating sufficient current to start operation of the vehicle's starter motor. It is well known that booster cables may be connected between a good battery and the poor one, however, in order to charge the latter. Typically, the booster cables are provided with spring loaded clamps known as alligator clamps so that they may easily be attached to the proper positive and negative posts of the respective batteries. Unfortunately, the battery posts are short in height and are surrounded by cable clamp. Thus, the alligator clips must be placed on the clamps that surround the posts. Due to the relatively large diameters of such clamps, the alligator clamps must be opened widely which greatly compresses the springs therein. Moreover, sparks are often generated when the clips are applied and such sparking can cause the battery to explode.

There is a need for a device that will facilitate the connection of a booster cable alligator clip to a battery post. The needed device would have utility in the context of top mounted battery posts and side mounted posts as well.

SUMMARY OF THE INVENTION

The longstanding but heretofore unfulfilled need for a device that enables the user of booster cables to easily connect the same to a battery post is now fulfilled in the form of a metallic plate member specifically adapted to engage a battery post and to lie beneath the cable clamps associated with the battery at all time. When not in use, the plate member is covered by a suitable cover member.

The proximal end of the device is annular in configuration, slideably engages a battery post and is preferably formed of copper or brass to ensure a good electrical connection between such proximal end and such post. The device further includes an elongate distal portion that is formed integral with the post-engaging proximal portion and which is preferaby made of lead. The distal portion is rectangular in configuration and has the appearance of a flat plate member. The juncture line between the loop-shaped proximal end of the device and the flat, plate-like distal end thereof is flexible so that the distal end may be disposed at an angle relative to the plane of the looped end.

When the device is installed on batteries having side mounted posts, the proximal and distal ends of the device are maintained in a co-planar relation to one another but the device is bent ninety (90) degrees at the juncture line between the two parts when the same is installed on batteries having top mounted posts. In either environment, a plastic or rubber cover is employed to cover the elongate distal portion of the device when it is not in use.

It is a primary object of this invention to provide a device that facilitates the use of booster cables.

Another object is to provide a device the use of which reduces the danger involved when jump starting a stalled vehicle through the use of booster cables.

BRIEF DESCRIPTION OF THE DRAWINGS

For a fuller understanding of the nature and objects of the invention, references should be made to the following detailed description, taken in connection with the accompanying drawings, in which:

FIG. 1 is a side elevational view of the subject post extender member installed on a battery having side mounted posts;

FIG. 2 is a side elevational view of the subject post extender member installed on a battery having top mounted posts;

FIG. 3 is a perspective view of the preferred embodiment of the invention;

FIG. 4 is a plan view of the preferred embodiment;

FIG. 5 is a longitudinal sectional view of the preferred embodiment;

FIG. 6 is a perspective view showing an environment of the subject device; and

FIG. 7 is a perspective view showing another environment of the subject device.

Similar reference numerals refer to similar parts throughout the several views of the drawing.

DETAILED DESCRIPTION OF THE PREFERRED EMBODIMENT

Referring now to FIG. 1, it will there be seen that a battery having side mounted posts is indicated as 10. Only one of the posts, indicated as 12, is shown but of course it is understood that there are two (2) of such posts on the battery. Side mounted post 12 is of course disposed horizontally as depicted in FIG. 1 and is cylindrical in configuration. A conventional split clamp 14 is shown attached to the post 12, such clamp being tightenable by battery post screw 15 in a well known manner. In conventional batteries, the height of post 12 is substantially the same as the thickness of clamp 14 so that when clamp 14 is operably mounted to post 12, the post is covered or surrounded by the clamp 14 and booster cables for use in jump starting a vehicle must be connected to such clamp 14.

In accordance with the teachings of this invention, however, the clamp 14 is removed from post 12, the post extender member which is the subject of this invention and indicated generally by the reference numeral 16 is installed in the manner hereinafter described, and the clamp 14 is re-attached to the post 12 in the well known manner.

Post extender member 16, as perhaps best shown in FIG. 3, has a loop-shaped proximal end 18 that is integrally formed with a flat, plate-like member 20 that is best shown in FIGS. 4 and 5. The member 20 is encased within plastic cover 22 when the device of this invention is not in use, but it should be understood that the cover 22 is removed from its sliding engagement with distal end 20 when it is desired to jump start a vehicle.

Returning now to FIG. 1, it is there and in FIG. 6 illustrated that the elongate distal end 20 is disposed in an upstanding configuration when installed in underlying relation to clamp 14 as depicted. Its height is such that it extends a few inches above the top of the battery, and it is this extension that enables an alligator clip to be mounted thereto easily.

FIGS. 2 and 7 depict the device 16 when operably installed on a top mounted post 24. The distal end 20 has been bent orthogonally relative to the proximal end 18 at flexible juncture line 26 (see also FIG. 5) so that it extends a few inches above the top of the battery in the same manner and for the same reason as the unbent device of FIG. 1.

Cover member 22 is formed of plastic or other suitable electrically insulating material, and has formed therein a central opening or bore conforming to the configuration and dimension of distal end 20 of the subject device. The rectangularly shaped bore is provided to slideably receive the distal end 20 so that the cover 22 can be placed into protective relation to the distal end 20 or removed therefrom in the absence of tools.

It is therefore seen that the objects set forth above, and those made apparent by the preceding description, are efficiently attained and since certain changes may be made in the above construction without departing from the scope of the invention, it is intended that all matters contained in the foregoing description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. A safety device that extends the effective length of a side mounted or a top mounted battery post, said battery post of the type engageable by a cable clamp means, comprising, a post extension member, said post extension member hving a proximal end and a distal end, said proximal end of said post extension member configured to define a battery post engaging means, said battery post engaging means adapted to releasably engage said battery post, said distal end of said post extension member configured to have an elongate, flat form, said proximal end and said distal end of said post extension member meeting at a juncture line, said juncture line being yieldable so that said distal end and said proximal end of said post extension member are positionable in differing angular positions relative to one another, said proximal end of said post engaging member being disposed in underlying relation to said cable clamp when said device is in its operative position, said distal end of said post engaging member being disposed substantially coplanar with said proximal end when said post engaging member is operatively installed on a battery having side mounted post members, said distal end of said post engaging member being disposed substantially orthogonal to said proximal end when said post engaging member is operatively installed on a battery having top mounted post members.

2. The safety device of claim 1, further comprising, a protective cover member adapted to cover said distal end of said post extension member when said post extension member is operatively installed on a battery post but is not in use.

3. The safety device of claim 2, wherein said proximal end of said post extension member is configured in the form of a closed loop and is slideably mounted on said battery post in underlying relation to said cable clamp member when operably installed.

4. The safety device of claim 3, wherein said proximal end of said post extension member is composed of an electrically conductive material.

5. The safety device of claim 4, wherein said distal end of said post extension member is composed of lead.

6. The safety device of claim 5, wherein said protective cover is composed of an electrical insulating material.

7. The safety device of claim 6, wherein said distal end of said post extension member, when installed on a side mounted battery post, has a length sufficient to extend above the plane defined by the top of a battery, said amount of extension being sufficient to provide an easily accessible mounting means to which an alligator clamp may be attached.

8. The safety device of claim 6, wherein said distal end of said post extension member, when installed on a top mounted battery post and bent at said juncture line relative to said proximal end, has a length sufficient to extend above the plane defined by the top of a battery, said amount of extension being sufficient to provide an easily accessible mounting means to which an alligator clamp may be attached.

* * * * *